US009268332B2

(12) United States Patent
Montemerlo et al.

(10) Patent No.: US 9,268,332 B2
(45) Date of Patent: Feb. 23, 2016

(54) ZONE DRIVING

(71) Applicant: Google Inc., Mountain View, CA (US)

(72) Inventors: Michael Steven Montemerlo, Mountain View, CA (US); Dmitri A. Dolgov, Los Altos, CA (US); Christopher Paul Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/324,470

(22) Filed: Jul. 7, 2014

(65) Prior Publication Data

US 2014/0324268 A1    Oct. 30, 2014

Related U.S. Application Data

(63) Continuation of application No. 13/932,090, filed on Jul. 1, 2013, now Pat. No. 8,825,264, which is a continuation of application No. 13/150,589, filed on Jun. 1, 2011, now Pat. No. 8,509,982.

(60) Provisional application No. 61/391,271, filed on Oct. 8, 2010, provisional application No. 61/390,094, filed on Oct. 5, 2010.

(51) Int. Cl.
*G05D 1/02* (2006.01)
*G05D 1/00* (2006.01)
(Continued)

(52) U.S. Cl.
CPC .............. *G05D 1/0214* (2013.01); *B60W 30/08* (2013.01); *G05D 1/0055* (2013.01); *G05D 1/021* (2013.01);
(Continued)

(58) Field of Classification Search
CPC .................. B60W 50/082; B60W 2050/0072; G05D 1/0061; G05D 1/021; G05D 1/0214; G05D 1/0274; G05D 1/0278
USPC ..................................................... 701/23, 25
See application file for complete search history.

(56) References Cited

U.S. PATENT DOCUMENTS

| 1,924,984 A | 8/1933 | Fageol |
| 3,186,508 A | 6/1965 | Lamont |

(Continued)

FOREIGN PATENT DOCUMENTS

| CN | 101073018 A | 11/2007 |
| CN | 101364111 A | 2/2009 |

(Continued)

OTHER PUBLICATIONS

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

(Continued)

*Primary Examiner* — Behrang Badii
*Assistant Examiner* — David Testardi
(74) *Attorney, Agent, or Firm* — Lerner, David, Littenberg, Krumholz & Mentlik, LLP

(57) ABSTRACT

A roadgraph may include a graph network of information such as roads, lanes, intersections, and the connections between these features. The roadgraph may also include one or more zones associated with particular rules. The zones may include locations where driving is typically challenging such as merges, construction zones, or other obstacles. In one example, the rules may require an autonomous vehicle to alert a driver that the vehicle is approaching a zone. The vehicle may thus require a driver to take control of steering, acceleration, deceleration, etc. In another example, the zones may be designated by a driver and may be broadcast to other nearby vehicles, for example using a radio link or other network such that other vehicles may be able to observer the same rule at the same location or at least notify the other vehicle's drivers that another driver felt the location was unsafe for autonomous driving.

20 Claims, 12 Drawing Sheets

(51) Int. Cl.
*B60W 30/08* (2012.01)
*B60W 30/186* (2012.01)
*B60W 50/029* (2012.01)
*G06K 9/00* (2006.01)
*G06K 9/32* (2006.01)

(52) U.S. Cl.
CPC ...... *B60W 30/186* (2013.01); *B60W 2050/0292* (2013.01); *B60W 2530/14* (2013.01); *B60W 2550/22* (2013.01); *G05D 1/024* (2013.01); *G05D 1/0246* (2013.01); *G05D 1/0257* (2013.01); *G05D 1/0274* (2013.01); *G05D 1/0278* (2013.01); *G05D 2201/0213* (2013.01); *G06K 9/00791* (2013.01); *G06K 9/00798* (2013.01); *G06K 9/00805* (2013.01); *G06K 9/3241* (2013.01)

(56) References Cited

U.S. PATENT DOCUMENTS

| | | | |
|---|---|---|---|
| 3,324,805 A | 6/1967 | Mulch | |
| 3,596,728 A | 8/1971 | Neville | |
| 4,372,414 A | 2/1983 | Anderson et al. | |
| 4,387,783 A | 6/1983 | Carman | |
| 4,656,834 A | 4/1987 | Elpern | |
| 4,924,795 A | 5/1990 | Ottemann | |
| 4,970,653 A | 11/1990 | Kenue | |
| 4,982,072 A | 1/1991 | Takigami | |
| 5,187,666 A | 2/1993 | Watanabe | |
| 5,415,468 A | 5/1995 | Latarnik et al. | |
| 5,448,487 A | 9/1995 | Arai | |
| 5,470,134 A | 11/1995 | Toepfer et al. | |
| 5,684,696 A | 11/1997 | Rao et al. | |
| 5,774,069 A | 6/1998 | Tanaka et al. | |
| 5,790,403 A | 8/1998 | Nakayama | |
| 5,906,645 A | 5/1999 | Kagawa et al. | |
| 5,913,376 A | 6/1999 | Takei | |
| 5,954,781 A | 9/1999 | Slepian et al. | |
| 6,055,042 A | 4/2000 | Sarangapani | |
| 6,064,926 A | 5/2000 | Sarangapani et al. | |
| 6,070,682 A | 6/2000 | Isogai et al. | |
| 6,151,539 A | 11/2000 | Bergholz et al. | |
| 6,195,610 B1 | 2/2001 | Kaneko | |
| 6,226,570 B1* | 5/2001 | Hahn | 701/1 |
| 6,321,147 B1 | 11/2001 | Takeda et al. | |
| 6,332,354 B1 | 12/2001 | Lalor | |
| 6,343,247 B2 | 1/2002 | Jitsukata et al. | |
| 6,385,539 B1 | 5/2002 | Wilson et al. | |
| 6,414,635 B1 | 7/2002 | Stewart et al. | |
| 6,438,472 B1 | 8/2002 | Tano et al. | |
| 6,438,491 B1 | 8/2002 | Farmer | |
| 6,453,056 B2 | 9/2002 | Laumeyer et al. | |
| 6,470,874 B1 | 10/2002 | Mertes | |
| 6,504,259 B1 | 1/2003 | Kuroda et al. | |
| 6,516,262 B2 | 2/2003 | Takenaga et al. | |
| 6,560,529 B1 | 5/2003 | Janssen | |
| 6,591,172 B2 | 7/2003 | Oda et al. | |
| 6,606,557 B2 | 8/2003 | Kotzin | |
| 6,643,576 B1 | 11/2003 | O Connor et al. | |
| 6,832,156 B2 | 12/2004 | Farmer | |
| 6,836,719 B2 | 12/2004 | Andersson et al. | |
| 6,847,869 B2 | 1/2005 | Dewberry et al. | |
| 6,862,524 B1 | 3/2005 | Nagda et al. | |
| 6,876,908 B2 | 4/2005 | Cramer et al. | |
| 6,934,613 B2 | 8/2005 | Yun | |
| 6,963,657 B1 | 11/2005 | Nishigaki et al. | |
| 7,011,186 B2 | 3/2006 | Frentz et al. | |
| 7,031,829 B2 | 4/2006 | Nisiyama | |
| 7,102,496 B1 | 9/2006 | Ernst, Jr. et al. | |
| 7,177,760 B2 | 2/2007 | Kudo | |
| 7,194,347 B2 | 3/2007 | Harumoto et al. | |
| 7,207,304 B2 | 4/2007 | Iwatsuki et al. | |
| 7,233,861 B2 | 6/2007 | Van Buer et al. | |
| 7,327,242 B2 | 2/2008 | Holloway et al. | |
| 7,346,439 B2 | 3/2008 | Bodin | |
| 7,373,237 B2* | 5/2008 | Wagner et al. | 701/96 |
| 7,394,046 B2 | 7/2008 | Olsson et al. | |
| 7,486,802 B2 | 2/2009 | Hougen | |
| 7,499,774 B2 | 3/2009 | Barrett et al. | |
| 7,499,776 B2 | 3/2009 | Allard et al. | |
| 7,499,804 B2 | 3/2009 | Svendsen et al. | |
| 7,515,101 B1 | 4/2009 | Bhogal et al. | |
| 7,565,241 B2 | 7/2009 | Tauchi | |
| 7,579,942 B2 | 8/2009 | Kalik | |
| 7,656,280 B2 | 2/2010 | Hines et al. | |
| 7,694,555 B2 | 4/2010 | Howell et al. | |
| 7,778,759 B2 | 8/2010 | Tange et al. | |
| 7,818,124 B2 | 10/2010 | Herbst et al. | |
| 7,835,859 B2 | 11/2010 | Bill | |
| 7,865,277 B1 | 1/2011 | Larson et al. | |
| 7,894,951 B2 | 2/2011 | Norris et al. | |
| 7,908,040 B2 | 3/2011 | Howard et al. | |
| 7,956,730 B2 | 6/2011 | White et al. | |
| 7,979,175 B2 | 7/2011 | Allard et al. | |
| 8,024,102 B2* | 9/2011 | Swoboda et al. | 701/96 |
| 8,050,863 B2 | 11/2011 | Trepagnier et al. | |
| 8,078,349 B1 | 12/2011 | Prada Gomez et al. | |
| 8,095,313 B1 | 1/2012 | Blackburn | |
| 8,126,642 B2 | 2/2012 | Trepagnier et al. | |
| 8,190,322 B2 | 5/2012 | Lin et al. | |
| 8,195,341 B2 | 6/2012 | Huang et al. | |
| 8,244,408 B2 | 8/2012 | Lee et al. | |
| 8,244,458 B1 | 8/2012 | Blackburn | |
| 8,260,515 B2 | 9/2012 | Huang et al. | |
| 8,280,601 B2 | 10/2012 | Huang et al. | |
| 8,280,623 B2 | 10/2012 | Trepagnier et al. | |
| 8,311,274 B2 | 11/2012 | Bergmann et al. | |
| 8,352,111 B2 | 1/2013 | Mudalige | |
| 8,352,112 B2 | 1/2013 | Mudalige | |
| 8,412,449 B2 | 4/2013 | Trepagnier et al. | |
| 8,452,506 B2 | 5/2013 | Groult | |
| 8,634,980 B1 | 1/2014 | Urmson et al. | |
| 8,694,236 B2 | 4/2014 | Takagi | |
| 8,706,394 B2 | 4/2014 | Trepagnier et al. | |
| 8,724,093 B2 | 5/2014 | Sakai et al. | |
| 8,775,063 B2 | 7/2014 | Zeng | |
| 8,831,813 B1 | 9/2014 | Ferguson et al. | |
| 8,855,860 B2 | 10/2014 | Isaji et al. | |
| 8,874,267 B1 | 10/2014 | Dolgov et al. | |
| 8,918,277 B2 | 12/2014 | Niem et al. | |
| 8,929,604 B2 | 1/2015 | Platonov et al. | |
| 8,948,954 B1 | 2/2015 | Ferguson et al. | |
| 8,949,016 B1 | 2/2015 | Ferguson et al. | |
| 8,970,397 B2 | 3/2015 | Nitanda et al. | |
| 8,972,093 B2 | 3/2015 | Joshi | |
| 9,008,369 B2 | 4/2015 | Schofield et al. | |
| 9,062,979 B1 | 6/2015 | Ferguson et al. | |
| 9,081,383 B1 | 7/2015 | Montemerlo et al. | |
| 2001/0037927 A1 | 11/2001 | Nagler et al. | |
| 2003/0016804 A1 | 1/2003 | Sheha et al. | |
| 2003/0055554 A1 | 3/2003 | Shioda et al. | |
| 2003/0093209 A1 | 5/2003 | Andersson et al. | |
| 2004/0243292 A1 | 12/2004 | Roy | |
| 2005/0012589 A1 | 1/2005 | Kokubu et al. | |
| 2005/0125154 A1 | 6/2005 | Kawasaki | |
| 2005/0149251 A1 | 7/2005 | Donath et al. | |
| 2005/0273251 A1 | 12/2005 | Nix et al. | |
| 2006/0037573 A1 | 2/2006 | Iwatsuki et al. | |
| 2006/0082437 A1 | 4/2006 | Yuhara | |
| 2006/0089764 A1 | 4/2006 | Filippov et al. | |
| 2006/0089765 A1 | 4/2006 | Pack et al. | |
| 2006/0089800 A1 | 4/2006 | Svendsen et al. | |
| 2006/0173841 A1 | 8/2006 | Bill | |
| 2006/0178240 A1 | 8/2006 | Hansel | |
| 2006/0276942 A1 | 12/2006 | Anderson et al. | |
| 2007/0010942 A1 | 1/2007 | Bill | |
| 2007/0142992 A1* | 6/2007 | Gronau et al. | 701/70 |
| 2007/0165910 A1 | 7/2007 | Nagaoka et al. | |
| 2007/0225909 A1 | 9/2007 | Sakano | |
| 2007/0239331 A1 | 10/2007 | Kaplan | |
| 2007/0247281 A1 | 10/2007 | Shimomura | |
| 2008/0021628 A1 | 1/2008 | Tryon | |
| 2008/0039991 A1 | 2/2008 | May et al. | |

(56) References Cited

U.S. PATENT DOCUMENTS

| | | |
|---|---|---|
| 2008/0040039 A1 | 2/2008 | Takagi |
| 2008/0056535 A1 | 3/2008 | Bergmann et al. |
| 2008/0059015 A1 | 3/2008 | Whittaker et al. |
| 2008/0059048 A1 | 3/2008 | Kessler et al. |
| 2008/0084283 A1 | 4/2008 | Kalik |
| 2008/0120025 A1 | 5/2008 | Naitou et al. |
| 2008/0120171 A1 | 5/2008 | Ikeuchi et al. |
| 2008/0147253 A1 | 6/2008 | Breed |
| 2008/0161987 A1 | 7/2008 | Breed |
| 2008/0167771 A1 | 7/2008 | Whittaker et al. |
| 2008/0183512 A1 | 7/2008 | Benzinger et al. |
| 2008/0188246 A1 | 8/2008 | Sheha et al. |
| 2008/0195268 A1 | 8/2008 | Sapilewski et al. |
| 2008/0277183 A1 | 11/2008 | Huang et al. |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0082879 A1 | 3/2009 | Dooley et al. |
| 2009/0115594 A1 | 5/2009 | Han |
| 2009/0164071 A1 | 6/2009 | Takeda |
| 2009/0198400 A1 | 8/2009 | Allard et al. |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0306834 A1 | 12/2009 | Hjelm et al. |
| 2009/0319096 A1 | 12/2009 | Offer et al. |
| 2009/0319112 A1 | 12/2009 | Fregene et al. |
| 2009/0326799 A1 | 12/2009 | Crook |
| 2010/0017056 A1 | 1/2010 | Asakura et al. |
| 2010/0052945 A1 | 3/2010 | Breed |
| 2010/0066587 A1 | 3/2010 | Yamauchi et al. |
| 2010/0076640 A1 | 3/2010 | Maekawa et al. |
| 2010/0079590 A1 | 4/2010 | Kuehnle et al. |
| 2010/0179715 A1* | 7/2010 | Puddy ............................ 701/23 |
| 2010/0179720 A1 | 7/2010 | Lin et al. |
| 2010/0191433 A1 | 7/2010 | Groult |
| 2010/0205132 A1 | 8/2010 | Taguchi |
| 2010/0228419 A1 | 9/2010 | Lee et al. |
| 2010/0241297 A1 | 9/2010 | Aoki et al. |
| 2010/0253542 A1 | 10/2010 | Seder et al. |
| 2010/0256836 A1 | 10/2010 | Mudalige |
| 2011/0010131 A1 | 1/2011 | Miyajima et al. |
| 2011/0071718 A1 | 3/2011 | Norris et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0210866 A1 | 9/2011 | David et al. |
| 2011/0213511 A1 | 9/2011 | Visconti et al. |
| 2011/0246156 A1 | 10/2011 | Zecha et al. |
| 2011/0254655 A1 | 10/2011 | Maalouf et al. |
| 2011/0264317 A1 | 10/2011 | Druenert et al. |
| 2012/0053775 A1 | 3/2012 | Nettleton et al. |
| 2012/0083960 A1 | 4/2012 | Zhu et al. |
| 2012/0114178 A1 | 5/2012 | Platonov et al. |
| 2012/0157052 A1 | 6/2012 | Quade |
| 2012/0271483 A1 | 10/2012 | Samukawa et al. |
| 2012/0277947 A1 | 11/2012 | Boehringer et al. |
| 2012/0283912 A1* | 11/2012 | Lee et al. ...................... 701/41 |
| 2013/0054049 A1 | 2/2013 | Uno |
| 2013/0054106 A1 | 2/2013 | Schmudderich et al. |
| 2013/0054128 A1 | 2/2013 | Moshchuk et al. |
| 2013/0144520 A1 | 6/2013 | Ricci |
| 2013/0179382 A1 | 7/2013 | Fritsch et al. |
| 2013/0282277 A1 | 10/2013 | Rubin et al. |
| 2013/0321400 A1 | 12/2013 | van Os et al. |
| 2013/0321422 A1 | 12/2013 | Pahwa et al. |
| 2014/0067187 A1 | 3/2014 | Ferguson et al. |
| 2014/0156164 A1 | 6/2014 | Schuberth et al. |
| 2014/0195138 A1 | 7/2014 | Stelzig et al. |
| 2014/0214255 A1 | 7/2014 | Dolgov et al. |
| 2014/0350836 A1 | 11/2014 | Stettner et al. |
| 2014/0369168 A1 | 12/2014 | Max et al. |
| 2015/0153735 A1 | 6/2015 | Clarke et al. |
| 2015/0177007 A1 | 6/2015 | Su et al. |
| 2015/0198951 A1 | 7/2015 | Thor et al. |
| 2015/0203107 A1 | 7/2015 | Lippman |

FOREIGN PATENT DOCUMENTS

| | | | |
|---|---|---|---|
| CN | 101522493 A | 9/2009 | |
| DE | 10218010 A1 | 11/2003 | |
| DE | 10336986 A1 | 3/2005 | |
| DE | 102009010006 | * 10/2009 | ............ B60W 30/06 |
| EP | 0884666 A1 | 12/1998 | |
| EP | 2216225 A1 | 8/2010 | |
| JP | 09066853 | 3/1997 | |
| JP | 09-160643 A | 6/1997 | |
| JP | H09-161196 A | 6/1997 | |
| JP | 11282530 A | 10/1999 | |
| JP | 2000149188 A | 5/2000 | |
| JP | 2000-193471 A | 7/2000 | |
| JP | 2000305625 A | 11/2000 | |
| JP | 2000-338008 A | 12/2000 | |
| JP | 2001-101599 A | 4/2001 | |
| JP | 2002236993 A | 8/2002 | |
| JP | 2002251690 A | 9/2002 | |
| JP | 2003081039 A | 3/2003 | |
| JP | 2003162799 A | 6/2003 | |
| JP | 2004-206510 A | 7/2004 | |
| JP | 2004-326730 A | 11/2004 | |
| JP | 2005067483 A | 3/2005 | |
| JP | 2005071114 A | 3/2005 | |
| JP | 2005-339181 A | 12/2005 | |
| JP | 2006322752 A | 11/2006 | |
| JP | 2007001475 A | 1/2007 | |
| JP | 2008117082 A | 5/2008 | |
| JP | 2008152655 A | 7/2008 | |
| JP | 2008170404 A | 7/2008 | |
| JP | 2008290680 A | 12/2008 | |
| JP | 2009053925 A | 3/2009 | |
| WO | 0070941 A1 | 11/2000 | |
| WO | 0188827 A1 | 11/2001 | |
| WO | 2007145564 A1 | 12/2007 | |
| WO | 2009028558 A1 | 3/2009 | |
| WO | 2009155228 A1 | 12/2009 | |
| WO | 2011021046 A1 | 2/2011 | |

OTHER PUBLICATIONS

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for the 2007 DARPA Urban Challenge, Dec. 2007, 27 pages.

Vincenzo DiLecce and Marco Calabrese, Experimental System to Support Real-Time Driving Pattern Recognition, 2008, pp. 1192-1199.

"Google Cars Drive Themselves, in Traffic" [online]. [Retrieved Aug. 19, 2011] Retrieved from the internet: <http://www.nytimes.com/2010/10/10/science/10google.html>, 4 pages.

International Search Report and the Written Opinion for Application No. PCT/US 2011/054154, Apr. 24, 2012.

International Search Report and Written Opinion for Application No. PCT/US2011/054899 dated May 4, 2012.

International Search Report and the Written Opinion for Application No. PCT/US 2011/054896, Apr. 25, 2012.

Eric Guizzo, How's Google's Self-Driving Car Works, IEEE. Org, IEEE, Oct. 18, 2011, pp. 1/31/-31/31.

International Search Report and Written Opinion for Application No. PCT/US2013/061604 dated Jul. 3, 2014.

Matthew McNaughton, Motion Planning for Autonomous Driving with a Conformal Spatiotempral Lattice, Internation Conference on Robotics and Automation, May 9-13, pp. 4889-4895, (2011).

Chinese Office Action for Application No. 201180057954.0 dated Apr. 29, 2015.

* cited by examiner

ZONE DRIVING

CROSS-REFERENCE TO RELATED APPLICATION

The present application is a continuation of U.S. patent application Ser. No. 13/932,090, entitled "ZONE DRIVING," filed Jul. 1, 2013, which is a continuation of U.S. patent application Ser. No. 13/150,589, entitled "ZONE DRIVING," filed Jun. 1, 2011, which claims the benefit of U.S. Provisional Application No. 61/390,094, entitled "AUTONOMOUS VEHICLES," filed Oct. 5, 2010, and U.S. Provisional Application No. 61/391,271, entitled "AUTONOMOUS VEHICLES," filed Oct. 8, 2010, the entire disclosures of which are hereby incorporated herein by reference.

BACKGROUND

Autonomous vehicles use various computing systems to aid in the transport of drivers from one location to another. Some autonomous vehicles may require some initial input or continuous input from an operator, such as a pilot or driver. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

These autonomous vehicles may maneuver themselves between locations based using highly detailed maps in conjunction with sensors for detecting objects in the vehicle's surroundings in order to maneuver the vehicle from one location to another. This may require the vehicle to navigate through areas where the driver may not feel particularly safe allowing the vehicle to maneuver itself. For example, a driver may feel less safe in areas such as merges, traffic circles, complicated intersections, etc. which may be considered more complicated for an autonomous vehicle to maneuver through. Thus, the driver may feel the need to continuously monitor the vehicle's location in case the driver must take control of the vehicle. This may lessen the usefulness of an autonomous vehicle and the driver's sense of safety.

BRIEF SUMMARY

One aspect of the disclosure provides a method for maneuvering a vehicle. The method includes accessing map information including one or more zones, each zone being associated with a rule that indicates a driver to take control of a control aspect of the vehicle; identifying, by a processor, a route based on the map information, where the route requires the vehicle to pass through at least one zone of the one or more zones; maneuvering, by the processor, the vehicle to the destination; and when the vehicle is within a predetermined distance along the route of the at least one zone, identifying the rule associated with the at least one zone, identifying the control aspect of the identified rule, and notifying the driver of the need to control the identified control aspect through the at least one zone.

In one example, the identified control aspect includes at least one of steering, acceleration, and braking. In another example, the method also includes receiving information indicating that the driver has taken control of the identified control aspect; waiting until the vehicle has left the at least one zone and the driver has relinquished control of the identified control aspect; and continuing to maneuver the vehicle along the route towards the destination. In another example, the method also includes receiving input identifying a destination location and identifying the route is further based on the destination location. The method may also include receiving instructions from the driver to avoid the at least one zone; generating a new route to the destination which does not pass through the at least one zone; and maneuvering the vehicle along the new route. In another example, the method also includes, when the driver has not taken control of the identified control aspect and once the vehicle reaches the at least one zone, maneuvering the vehicle through the at least one zone along the route. In another example, the method also includes identifying a first location based on the driver controlling a given control aspect of the vehicle; identifying a second location based on the driver relinquishing control of the given control aspect of the control vehicle; generating a new zone based on the first location and the second location; generating a new rule for the new zone based on the given control aspect; and storing the new zone and the new rule with the map information. The method may also include transmitting the new zone and the new rule to another vehicle.

Another aspect of the invention provides a tangible, non-transitory, computer-readable storage medium on which computer readable instructions of a program are stored. The instructions, when executed by a processor, cause the processor to perform a method of maneuvering a vehicle. The method includes accessing map information including one or more zones, each zone being associated with a rule that indicates a driver to take control of a control aspect of the vehicle; identifying, by a processor, a route based on the map information, where the route requires the vehicle to pass through at least one zone of the one or more zones; maneuvering, by the processor, the vehicle to the destination; and when the vehicle is within a predetermined distance along the route of the at least one zone, identifying the rule associated with the at least one zone, identifying the control aspect of the identified rule, and notifying the driver of the need to control the identified control aspect through the at least one zone.

In one example, the identified control aspect includes at least one of steering, acceleration, and braking. In another example, the method also includes receiving information indicating that the driver has taken control of the identified control aspect; waiting until the vehicle has left the at least one zone and the driver has relinquished control of the identified control aspect; and continuing to maneuver the vehicle along the route towards the destination. In another example, the method also includes receiving input identifying a destination location and identifying the route is further based on the destination location. The method may also include receiving instructions from the driver to avoid the at least one zone; generating a new route to the destination which does not pass through the at least one zone; and maneuvering the vehicle along the new route. In another example, the method also includes, when the driver has not taken control of the identified control aspect and once the vehicle reaches the at least one zone, maneuvering the vehicle through the at least one zone along the route. In another example, the method also includes identifying a first location based on the driver controlling a given control aspect of the vehicle; identifying a second location based on the driver relinquishing control of the given control aspect of the control vehicle; generating a new zone based on the first location and the second location; generating a new rule for the new zone based on the given control aspect; and storing the new zone and the new rule with the map information. The method may also include transmitting the new zone and the new rule to another vehicle.

Yet another aspect of the disclosure provides a vehicle. The vehicle includes a plurality of control aspects for controlling movement of the vehicle; memory storing map information including one or more zones, each zone being associated with a rule that indicates a driver to take control of at least one control aspect of the plurality of control aspects; and a processor coupled to the plurality of control aspects and the memory. The processor is operable to identify a route based on the map information, where the route requires the vehicle to pass through at least one zone of the one or more zones; maneuver the vehicle along the route; and when the vehicle is within a predetermined distance along the route of the at least one zone, identify the rule associated with the at least one zone, identify the control aspect of the identify rule, and notify a driver of the need to control the identified control aspect through the at least one zone.

In one example, the processor is further operable to, when the driver has not taken control of the identified control aspect and once the vehicle reaches the at least one zone, maneuver the vehicle through the at least one zone along the route. In another example, the processor is also operable to identify a first location based on the driver controlling a given control aspect of the vehicle; identify a second location based on the driver relinquishing control of the given control aspect of the vehicle; generate a new zone based on the first location and the second location; generate a new rule for the new zone based on the given control aspect; and store the new zone and the new rule with the map information. The processor may also be operable to operable to transmit the new zone and the new rule to another autonomous vehicle. In another example, the identified control aspect includes at least one of a steering system, an acceleration system, and a braking system.

Still a further aspect of the disclosure provides a method of maneuvering a vehicle. The method includes maneuvering, by a processor, the vehicle along a current path on a roadway; determining whether the vehicle is within a distance along the current path of at least one zone associated with a rule that requires a driver to take control of at least one control aspect of the vehicle; and when the vehicle is within the distance along the current path of the at least one zone, notifying the driver of the need to control the at least one control aspect through the at least one zone.

In one example, the at least one control aspect includes at least one of steering, acceleration, and braking. In another example, the method also includes receiving information indicating that the driver has taken control of the identified control aspect; waiting until the vehicle has left the at least one zone and the driver has relinquished control of the identified control aspect; and continuing to maneuver the vehicle by the processor. In another example, the method also includes, when the driver has not taken control of the at least one control aspect and once the vehicle reaches the at least one zone, maneuvering the vehicle through the at least one zone. In another example, the method also includes identifying a first location based on the driver controlling a given control aspect of the vehicle; identifying a second location based on the driver relinquishing control of the given control aspect of the vehicle; generating a new zone based on the first location and the second location; generating a new rule for the new zone based on the given control aspect; and storing the new zone and the new rule with the map information. The method may also include transmitting the new zone and the new rule to another vehicle.

DETAILED DESCRIPTION

Figure 1:
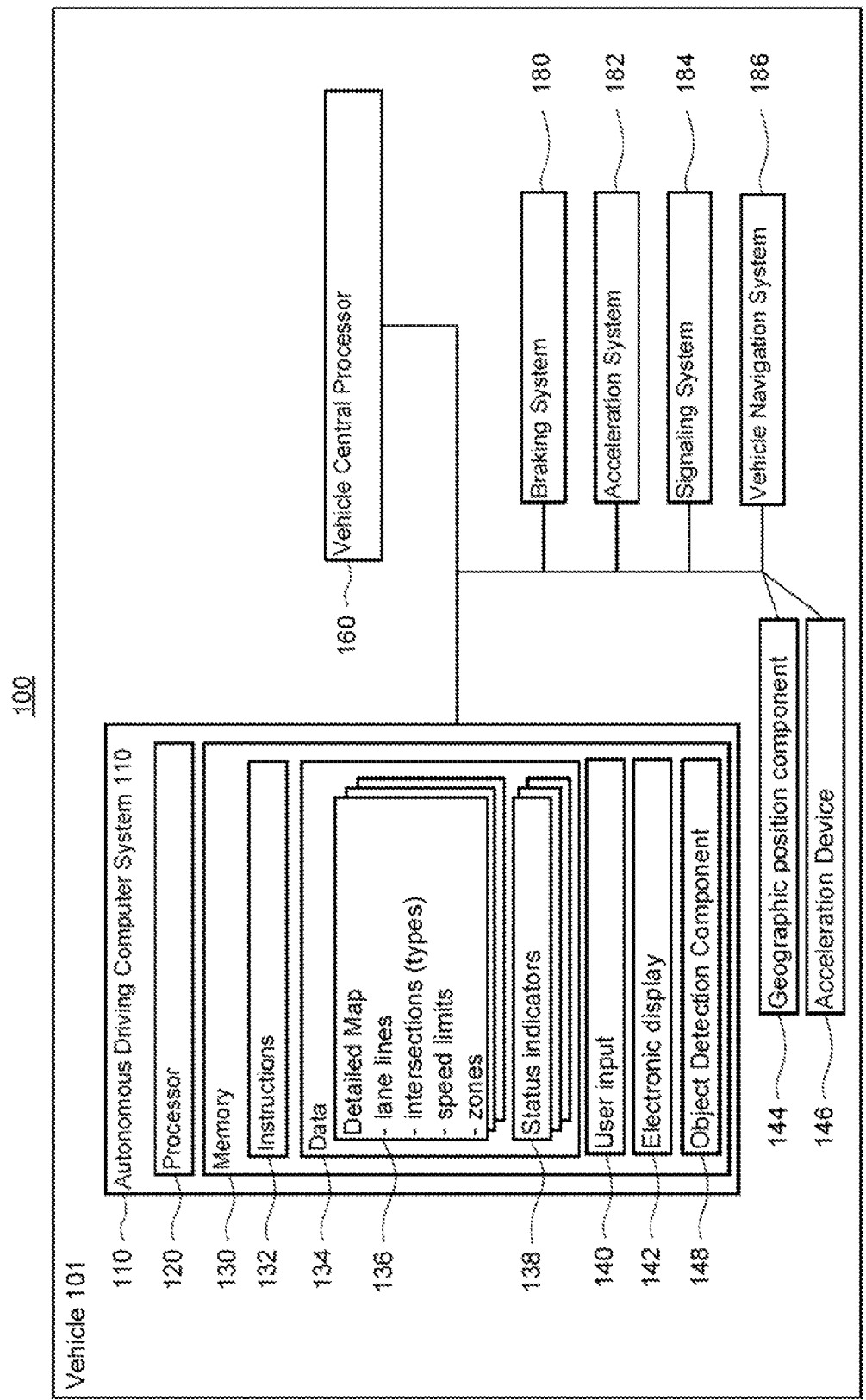
FIG. 1 is a functional diagram of a system in accordance with an exemplary embodiment.

As shown in FIG. 1, an autonomous driving system 100 in accordance with one aspect of the disclosure includes a vehicle 101 with various components. While certain aspects of the disclosure are particularly useful in connection with specific types of vehicles, the vehicle 101 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components, acceleration and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle and others by a remote processor, including taking the steps necessary to execute a single maneuver.

Computer 110 may all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
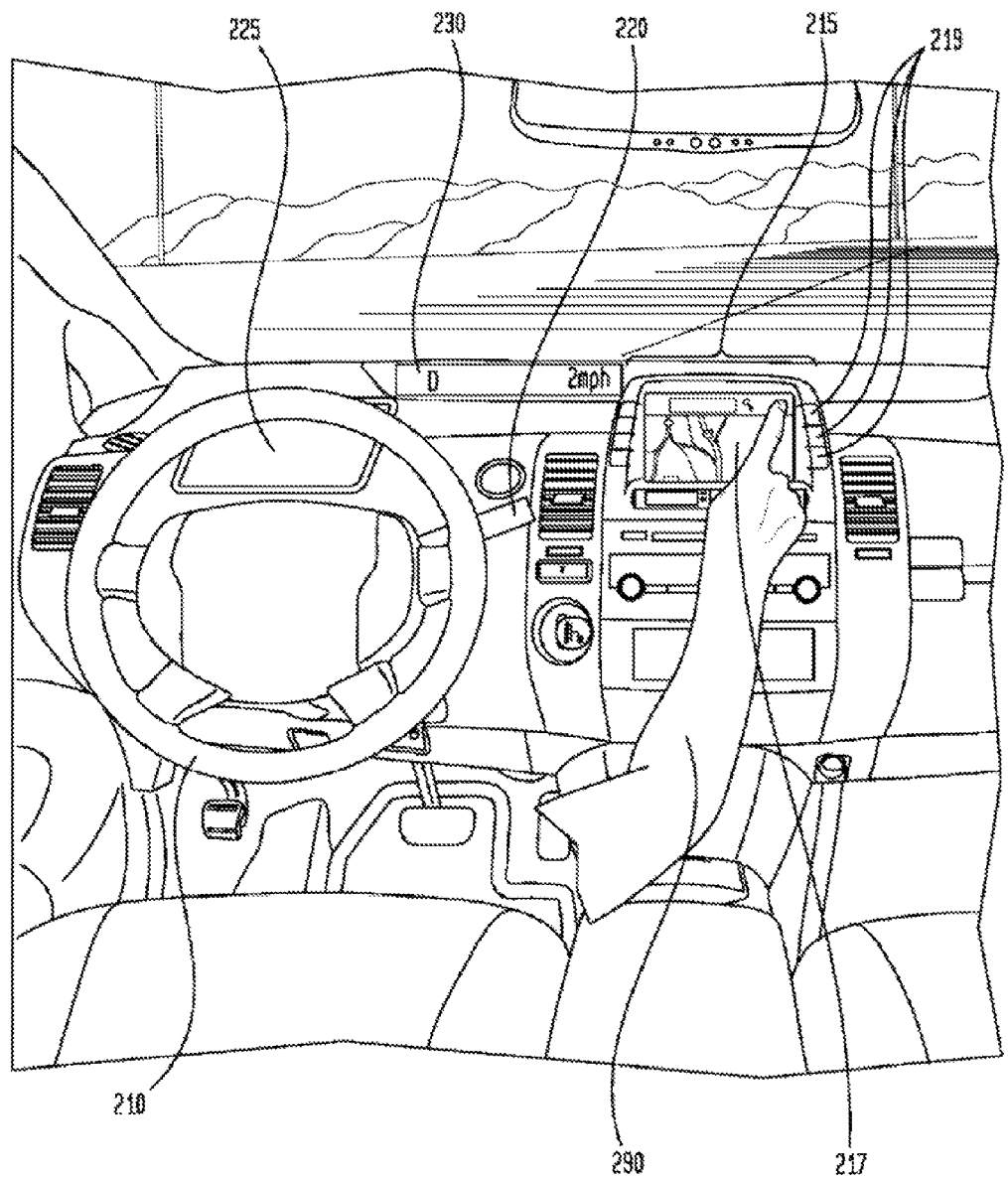
FIG. 2 is an interior of an autonomous vehicle in accordance with an exemplary embodiment.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or driver 290 to provide information, such as a navigation destination, to the autonomous driving computer 110.

Vehicle 101 may include one or more additional displays. For example, the vehicle may include a display 225 for displaying information regarding the status of the autonomous vehicle or its computer. In another example, the vehicle may include a status indicating apparatus 138 (see FIG. 1), such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include one or more object detection components 148 for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small driver vehicle, the car may include a laser mounted on the roof or other convenient location.

Figure 3:
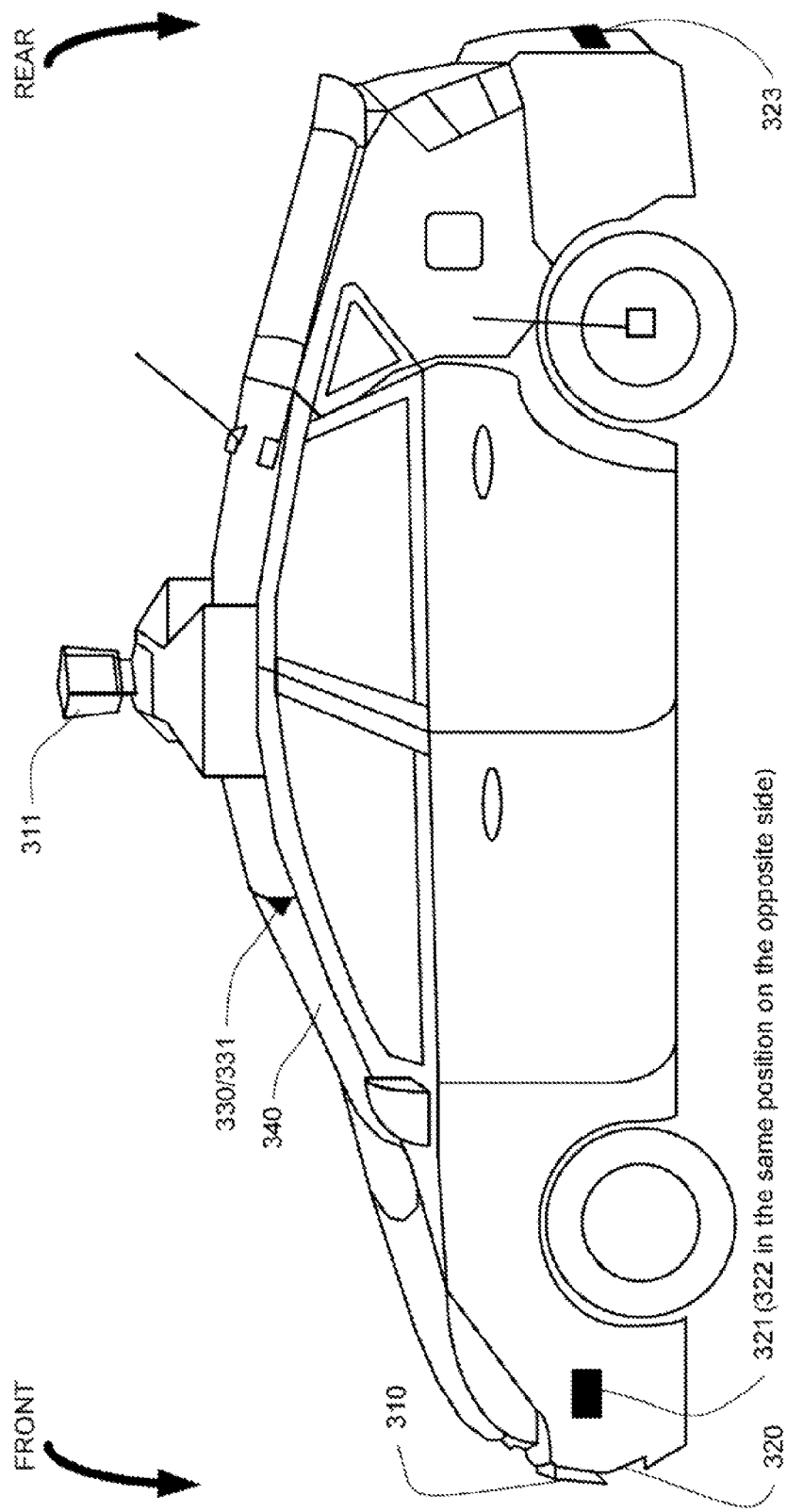
FIG. 3 is an exterior of an autonomous vehicle in accordance with an exemplary embodiment

As shown in FIG. 3, small driver vehicle 300 may include lasers 310 and 311, mounted on the front and top of the vehicle, respectively. Laser 310 may have a range of 150 meters, a thirty degree vertical field of view, and a thirty degree horizontal field of view. Laser 311 may have a range of 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 300 includes radar detection units 320-323 located on the side (only one side being shown), front and rear of the vehicle. Each of these radar detection units may have a range of 200 meters for an 18 degree field of view as well as a range of 60 meters for a 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 300 may include 2 cameras 330-331 mounted under a windshield 340 near the rear view mirror (not shown). Camera 330 may include a range of 200 meters and a 30 degree horizontal field of view, while camera 331 may include a range of 100 meters and a 60 degree horizontal field of view.

The aforementioned sensors may allow the vehicle to evaluate and potentially respond to its environment in order to maximize safety for the driver, other drivers, as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, break pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Again, although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 4:
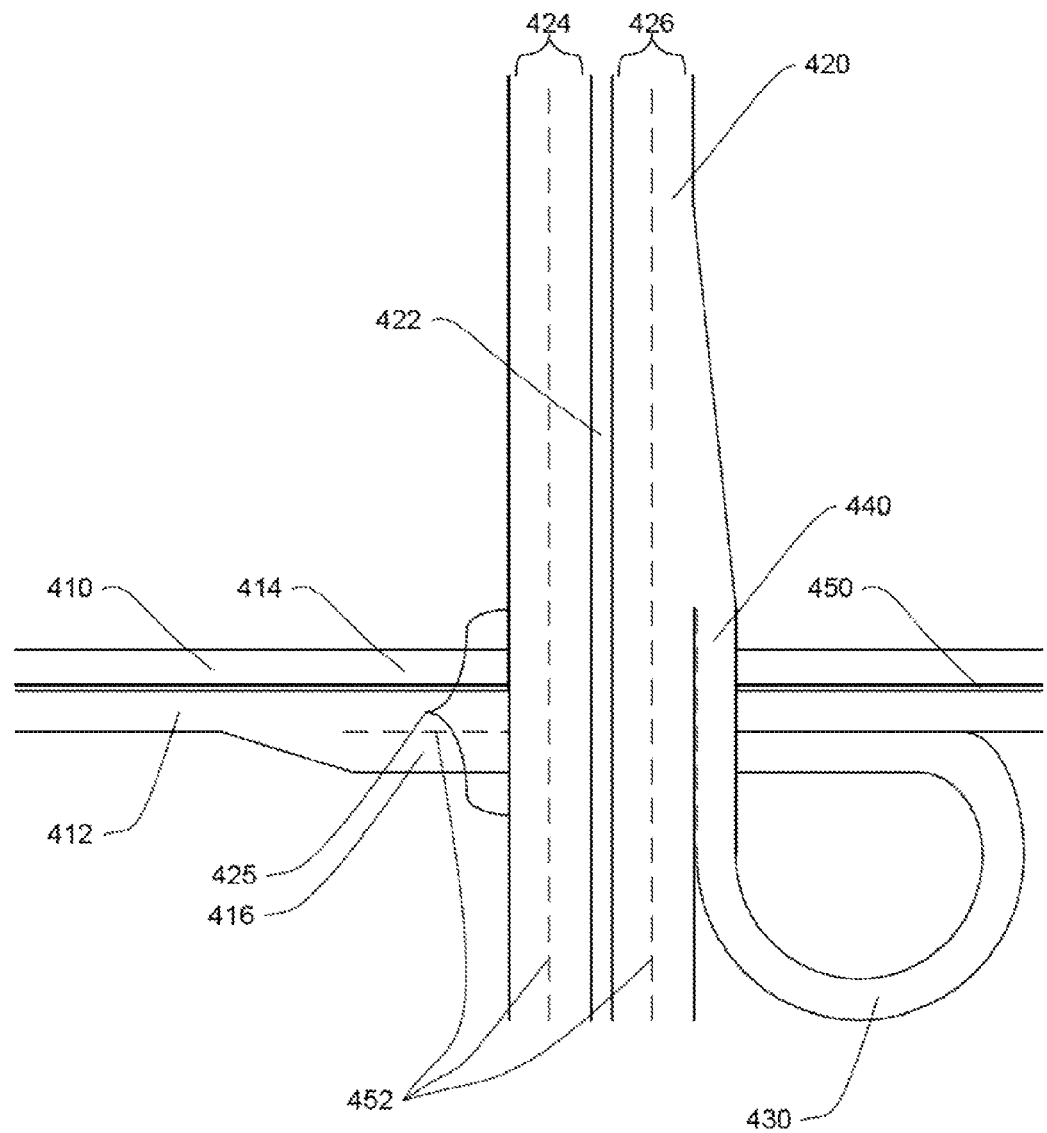
FIG. 4 is a road map in accordance with an exemplary embodiment.

For example, map 400 of FIG. 4 is an exemplary pictorial representation of a portion of a roadgraph including a two lane road which passes under a highway 420 at overpass section 425. The map includes features such as eastbound lane 412, westbound lane 414, and exit lane 416 of the road 410. Similarly, highway 420 includes a median 422, northbound lanes 426, southbound lanes 424, and shoulders 428. Eastbound lane of the road 410 connects with highway 420 by way of exit lane 416, entrance ramp 430, and acceleration lane 440. The map may also include additional roadway details such as double yellow lines 450 and lane lines 452 as well as signs (not shown) or other roadway features.

In some examples the map information may include zones. Each zone may comprise a geolocated area or point associated with particular rules. The zones may include places where driving may become complicated or challenging for humans and computers, such as merges, construction zones, or other obstacles. As described in more detail below, a zone's rules may require an autonomous vehicle to alert the driver that the vehicle is approaching an area where it may be challenging for the vehicle to drive autonomously. In one example, the vehicle may require a driver to take control of steering, acceleration, deceleration, etc. In another example, a zone's rules may require an autonomous vehicle to alert the driver, but rather than requiring the driver to take control, the vehicle may lower its speed and/or increase its following distance (between the autonomous vehicle and another vehicle).

Figure 5:
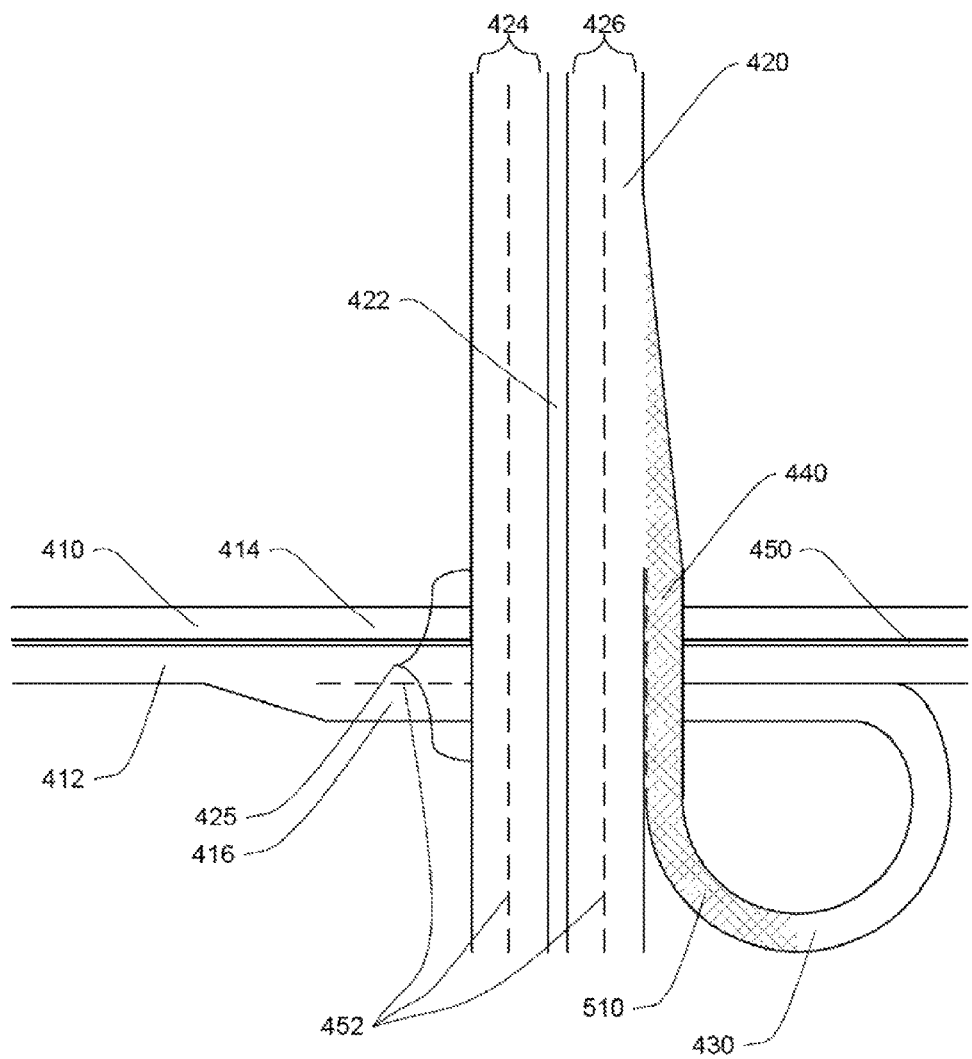
FIG. 5 is another road map in accordance with an exemplary embodiment.

For example, as shown in map 500 of FIG. 5, the map information may include zone 510. This zone includes acceleration lane 440 where merging into traffic may be difficult for an autonomous vehicle. Because of this difficulty, zone 510 may be associated with a rule which requires a driver to take control of steering, acceleration, and/or braking of the autonomous vehicle while within zone 510.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
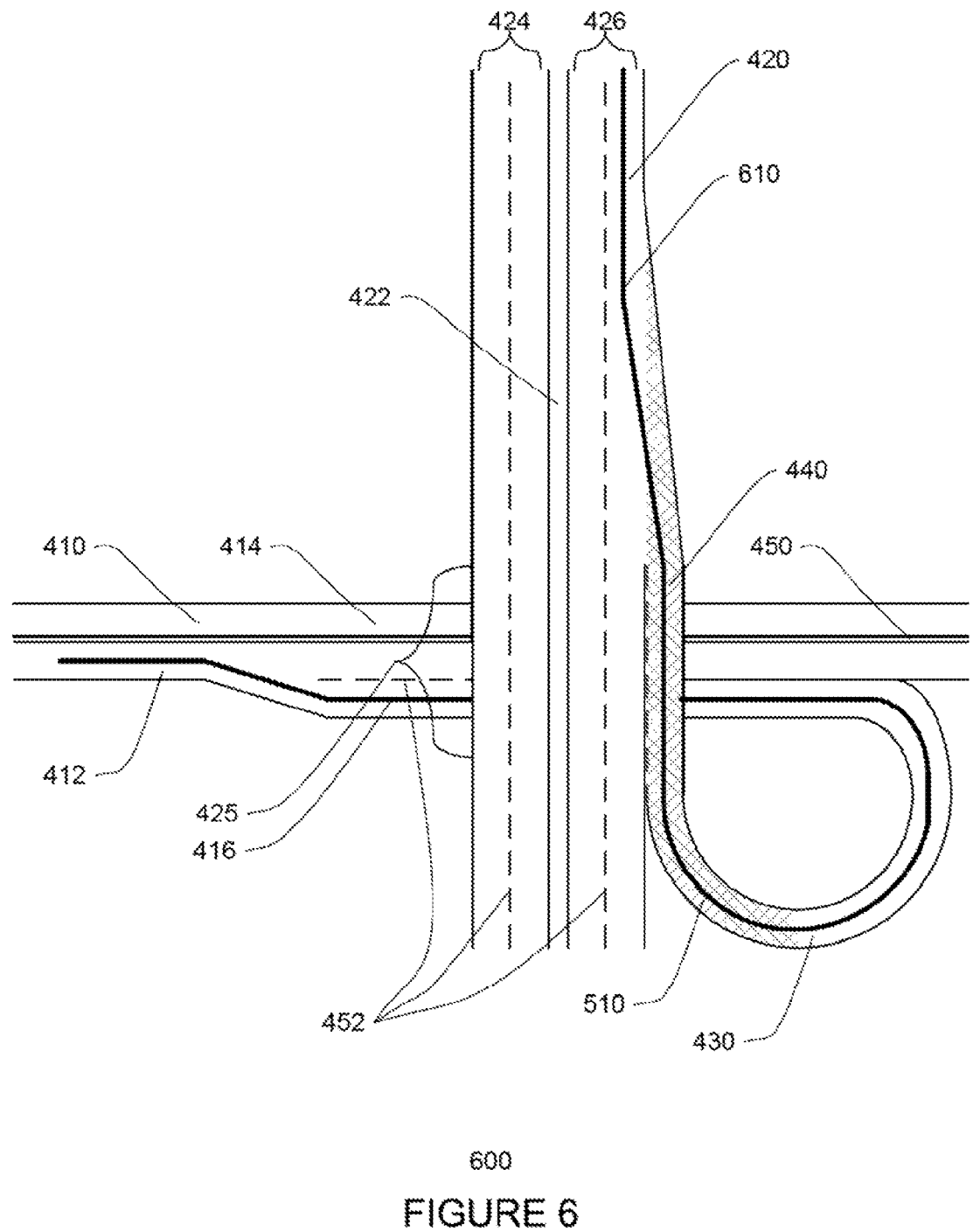
FIG. 6 is another road map in accordance with an exemplary embodiment.

An autonomous vehicle may transport itself, a driver, passengers, and/or cargo between two locations by following a route. For example, a driver may input a destination and activate an autonomous mode of the vehicle. In response, the vehicle's computer may calculate a route based on the roadgraph, its current location, and the destination. The route may include information such as where to turn, at what speeds to travel, where to look for traffic signals, where to stop for intersections or stop signs, etc. For example, as shown in map 600 of FIG. 6, route 610 may require an autonomous vehicle to take the road 410 and exit onto highway 420. This may require the vehicle to travel in the eastbound lane 412 of the road 410 to exit lane 416 to entrance ramp 430 to acceleration lane 440 and onto highway 420. While not all routes may include zones, in the example of FIG. 6, route 610 also requires the autonomous vehicle to pass through zone 510.

Figure 7:
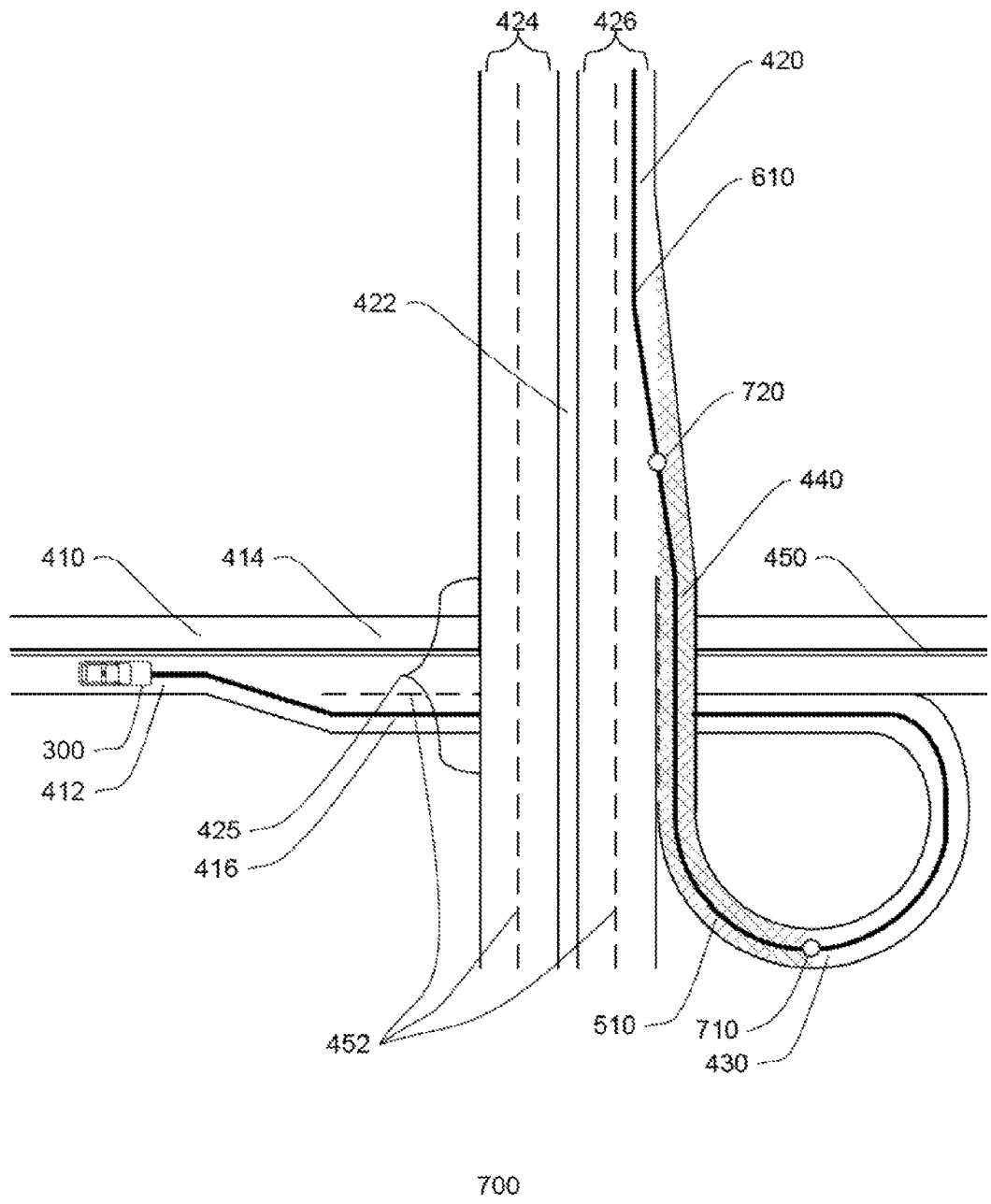
FIG. 7 is another road map in accordance with an exemplary embodiment.

As shown in map 700 of FIG. 7, autonomous vehicle 300 travels along route 610. As autonomous vehicle 300 approaches zone 510, the autonomous vehicle's computer may identify the rules associated with zone 510. As noted above, zone 510's rules may require that a driver take control of steering, acceleration and braking while the autonomous vehicle passes through zone 510, for example, from point 710 to point 720 along route 610.

The autonomous vehicle may notify a driver that the vehicle is approaching a zone with particular rules by providing visual or audible cues to the driver. The notifications may be based on a combination of time and distance to the zone. If the autonomous vehicle is moving at a reasonable speed, the notification may be based upon an estimated time to cross the remaining distance to the zone. For example, if vehicle 1 is moving at 25 miles per hour, the notification may be given when vehicle 1 is X distance from the zone. If vehicle 2 is moving at 50 miles per hour, the notification may be given when vehicle 2 is 2X distance from the zone. Thus, the time to the zone may be the same for both vehicles 1 and 2. If the autonomous vehicle is moving at very slow speeds, for example in stop-and-go traffic, the notification may be based upon the distance to the zone.

For example, before reaching point 710, autonomous vehicle 300's computer may present a warning to the driver, for example on display 225, on status bar 230, audibly, etc. indicating that the vehicle is approaching or within some distance of a zone which requires the driver to take control of the vehicle. For example, the vehicle may display a map similar to map 700 highlighting the zone and announce through a speaker "please take control of the vehicle while passing through the zone." The warnings may also include flashing lights, beeping, vibrating, etc.

In response to the warning, the driver may select to navigate around the zone, ignore the zone and rules, or simply take over control of one or more aspects of the autonomous vehicle. For example, the driver may request that the autonomous vehicle route itself around the zone so that the driver does not need to take control. The driver may, for example, speak his request or select an option using one or more inputs, such as a touch screen or button inputs 219. The autonomous vehicle's computer may re-route itself and identify a new route which does not require the vehicle to pass through a zone.

In another example, the driver may elect to ignore the zone. In response, the vehicle, if it is able, may continue to drive itself through the zone. This may be helpful where there are no other vehicles, pedestrians, obstacles, etc. In this case, the vehicle may cease warning the driver, may continue to warn the driver that the vehicle is approaching a zone (until the vehicle reaches the zone), or the warning may change, for example, where the vehicle is within the zone. The new warning may be somewhat more serious, for example, warning that failure to take control may be dangerous in certain situations, increasing audible or tactile cues, flashing lights, etc.

In some examples, the rules may only require that the driver take control of the steering, acceleration and braking, or all of these features. For example, if the zone is a park or other location where pedestrians are typically walking, the vehicle may slow down dramatically and require the driver only to steer by turning the steering wheel 210. In another example, if the zone is a merge onto a highway, the autonomous vehicle may steer itself to remain in the middle of the lane while the driver controls the acceleration and deceleration (gas and brake) to adjust the vehicle's speed based on merging traffic.

In yet another example, rather than following a particular route to a destination, a driver may instruct the autonomous vehicle to continue on a particular roadway until the driver resumes control or provides further instructions to the vehicle. For example, a driver may allow the vehicle's computer to steer the vehicle and control the vehicle's speed along the highway until the driver takes control of the steering wheel, acceleration, braking, etc. In this example, the computer may control the vehicle to follow the path of the roadway or the particular lane in which the vehicle currently is. If the vehicle is approaching a zone through which the vehicle would pass if it continued along the current path, the computer may notify the driver of the approaching zone. The computer may also identify the need to take control of some control feature (steering, braking, acceleration, etc.), and the computer may also take one or more of the actions described above. In response, as described above, the driver may take control of the control feature, ignore the warning, route the vehicle around the zone, etc.

Figure 8:
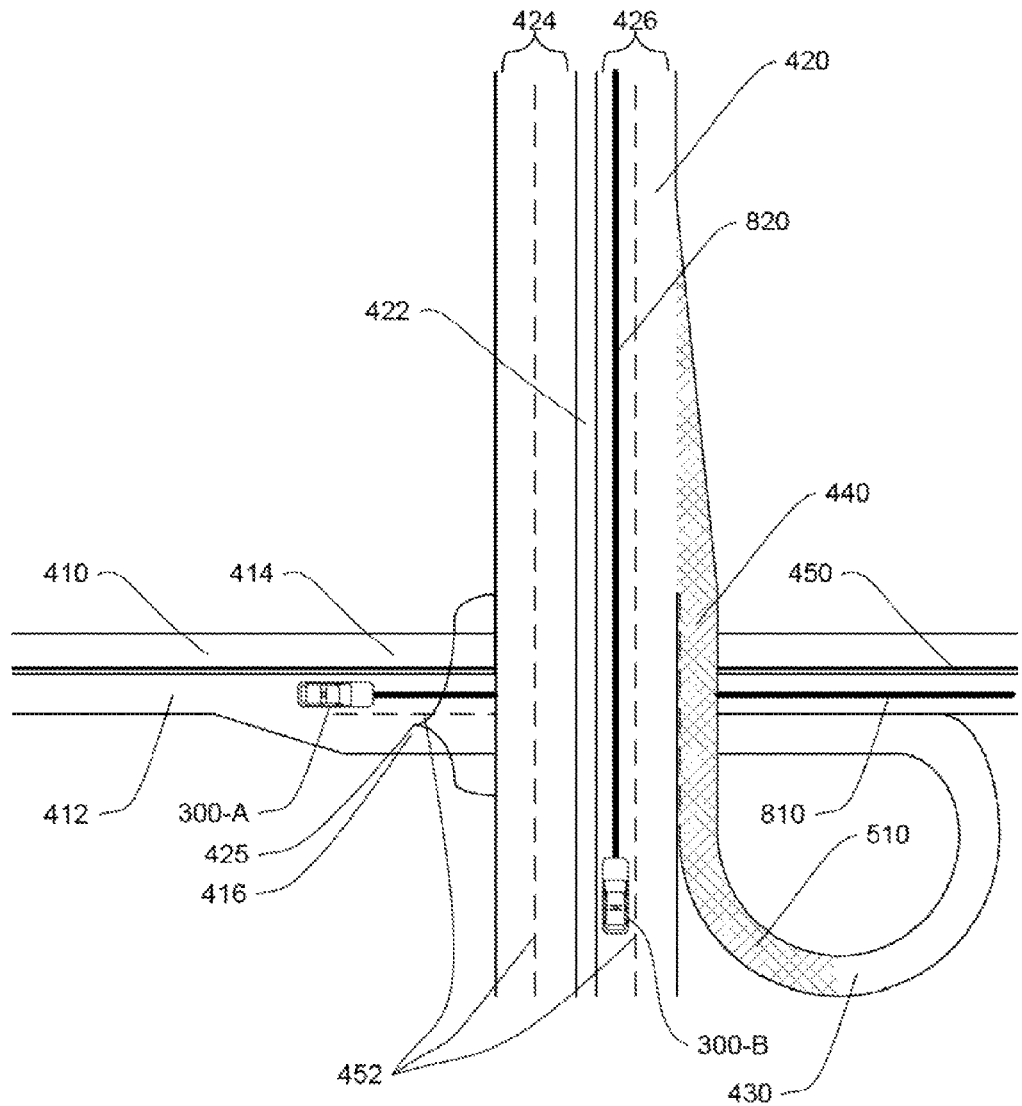
FIG. 8 is another road map in accordance with an exemplary embodiment.

However, merely approaching a zone may not be sufficient to initiate the warnings to a driver. For example, as shown in map 800 of FIG. 8, autonomous vehicle 300-A is traveling along route 810 approaching overpass section 425 of highway 420 in eastbound lane 412 of the road 410. Although the vehicle is approaching zone 510, the autonomous vehicle may not actually provide any warnings to the driver as the vehicle is not actually traveling through zone 510, but below the zone. Similarly, autonomous vehicle 300-B is traveling along route 820 in a northbound lane 426 of highway 420 passing zone 510. Again, although vehicle 300-B may come very close to zone 510, the vehicle may not provide its driver with a warning as the vehicle may not actually travel through zone 510, but next to the zone.

Figure 9A:
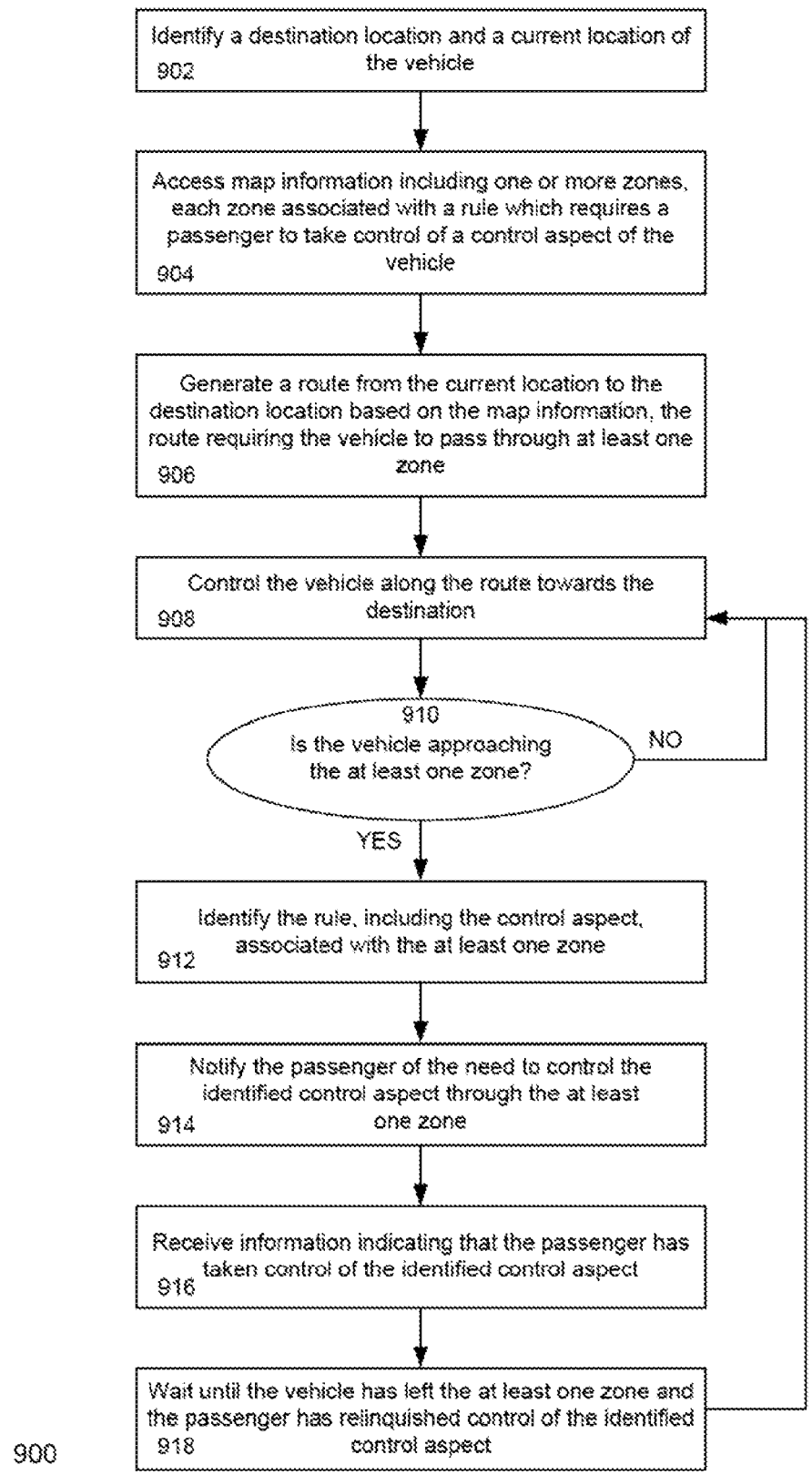
FIGS. 9A-9C are flow diagrams in accordance with exemplary embodiments.
Figure 9B:
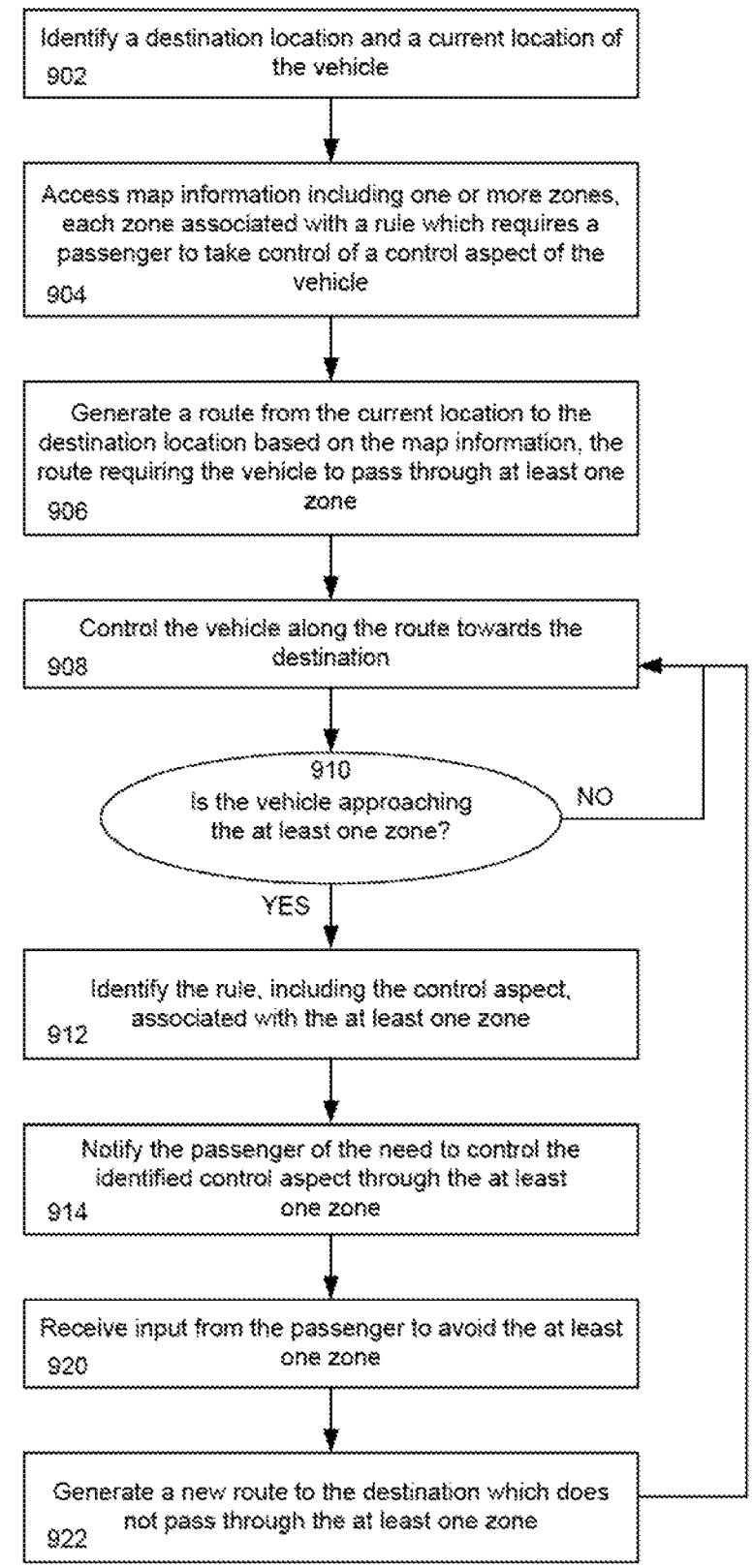
Figure 9C:
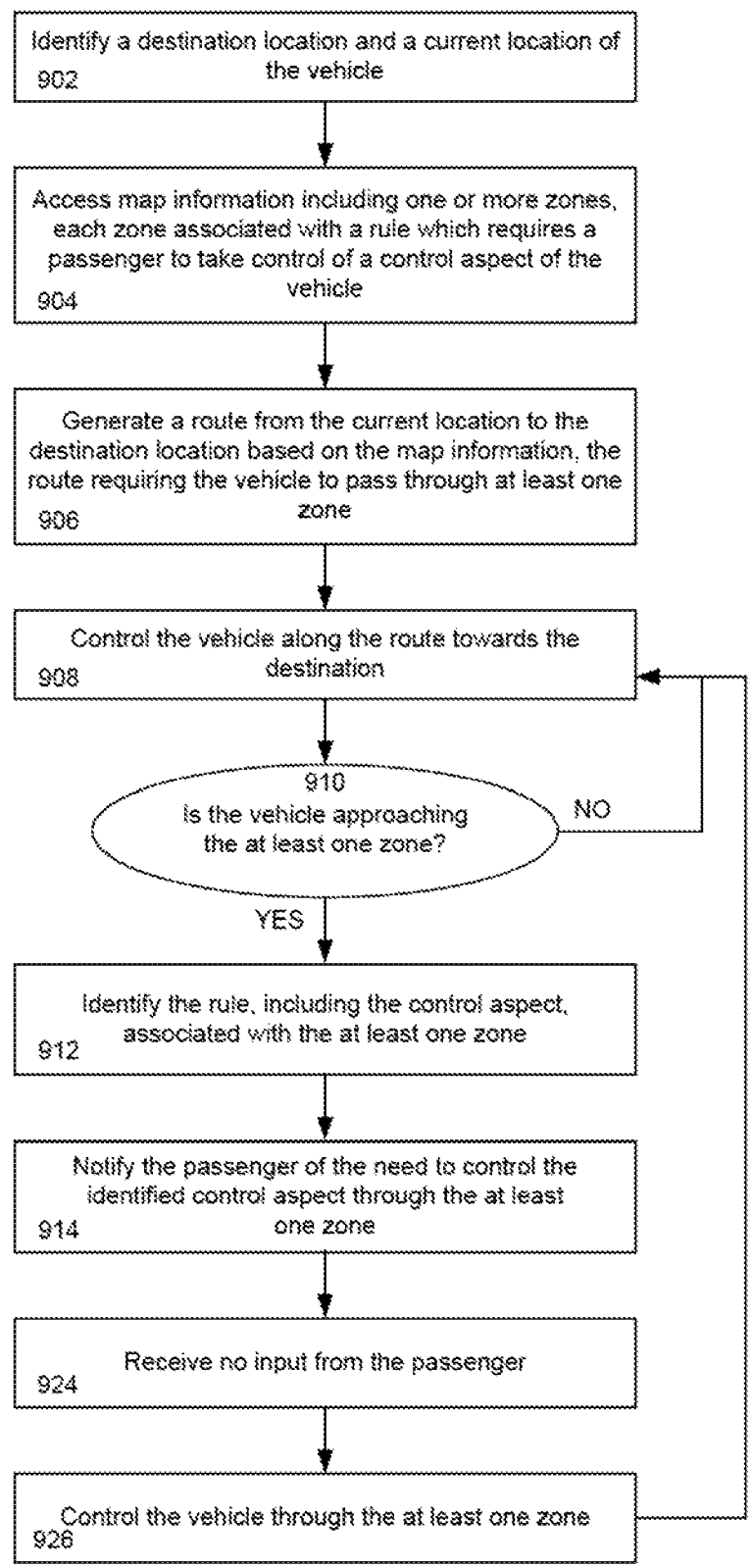

Flow diagram 900 of FIGS. 9A-9C provides an exemplary overview of the process described above. As shown in block 902 of FIG. 9A, an autonomous vehicle's computer may identify a destination location and a current location of the vehicle. For example, a driver may enter a destination location into a navigation device of the vehicle. The current location of the vehicle may be determined based on data received from one or more geographic location devices. At block 904, the computer accesses map information including one or more zones. Each zone is associated with a rule which requires a driver to take control of a control aspect of the vehicle. For example, a rule may require a driver to control the steering, acceleration, and/or braking of the vehicle while the vehicle is in the zone. At block 906, the computer generates a route from the current location to the destination location based on the map information, where the route requires the vehicle to pass through at least one zone. As noted above, the route need not include zones.

The computer then controls the vehicle to the destination along the route at block 908. At block 910, the computer determines whether the vehicle is approaching the at least one zone. For example, based on the current speed of the vehicle, the computer may determine whether the vehicle is within a particular distance from or an estimated time to reach the zone. If not, the computer continues to control the vehicle to the destination at block 908. Returning to block 910, if the computer determines that the vehicle is approaching the at least one zone, the computer identifies the rule and the control aspect, associated with at least one zone at block 912.

The computer then notifies the driver of the need to control the identified control aspect through the at least one zone at block 914. In one example, the computer receives information indicating that the driver has taken control of the identified control aspect at block 916. The computer waits until the vehicle has left the at least one zone and the driver has relinquished control of the identified control aspect at block 918. The computer then continues to control the vehicle along the route towards the destination at block 908.

In another example, the driver may decide to instruct the computer to avoid the at least one zone. As shown in block 920 of FIG. 9B, the computer receives instructions from the driver to avoid the zone. In response, the computer generates a new route to the destination which does not pass through the at least one zone at block 922. The computer then continues to control the vehicle along the new route towards the destination at block 908.

In yet another example, after notifying the driver of the approaching zone, the computer may receive no input as shown in block 924 of FIG. 9C. The computer may continue to notify the driver of the need to control the identified control aspect through the at least one zone. Once the vehicle reaches the at least one zone, the computer may control the vehicle through the at least one zone at block 926. The computer then continues to control the vehicle along the route towards the destination at block 908.

As noted above, the zones may be pre-identified in the roadgraph or may be set on demand by a driver. For example, a driver who notices a temporary construction or roadblock may tag the location as one at which vehicles should not drive autonomously. In that regard, the driver may take control of the vehicle and at the same time, generate a zone rule for the location. The new zone may begin where the driver has taken control of the autonomous vehicle and end where the driver has relinquished control to the computer. In some example, the new zones may be temporarily stored by the vehicle. The length of time may be based on the reason for the zone. For example, some construction projects may take only a day while others may take much longer. In this example, the driver may use the inputs to identify how long the computer is to keep the zone.

Figure 10:
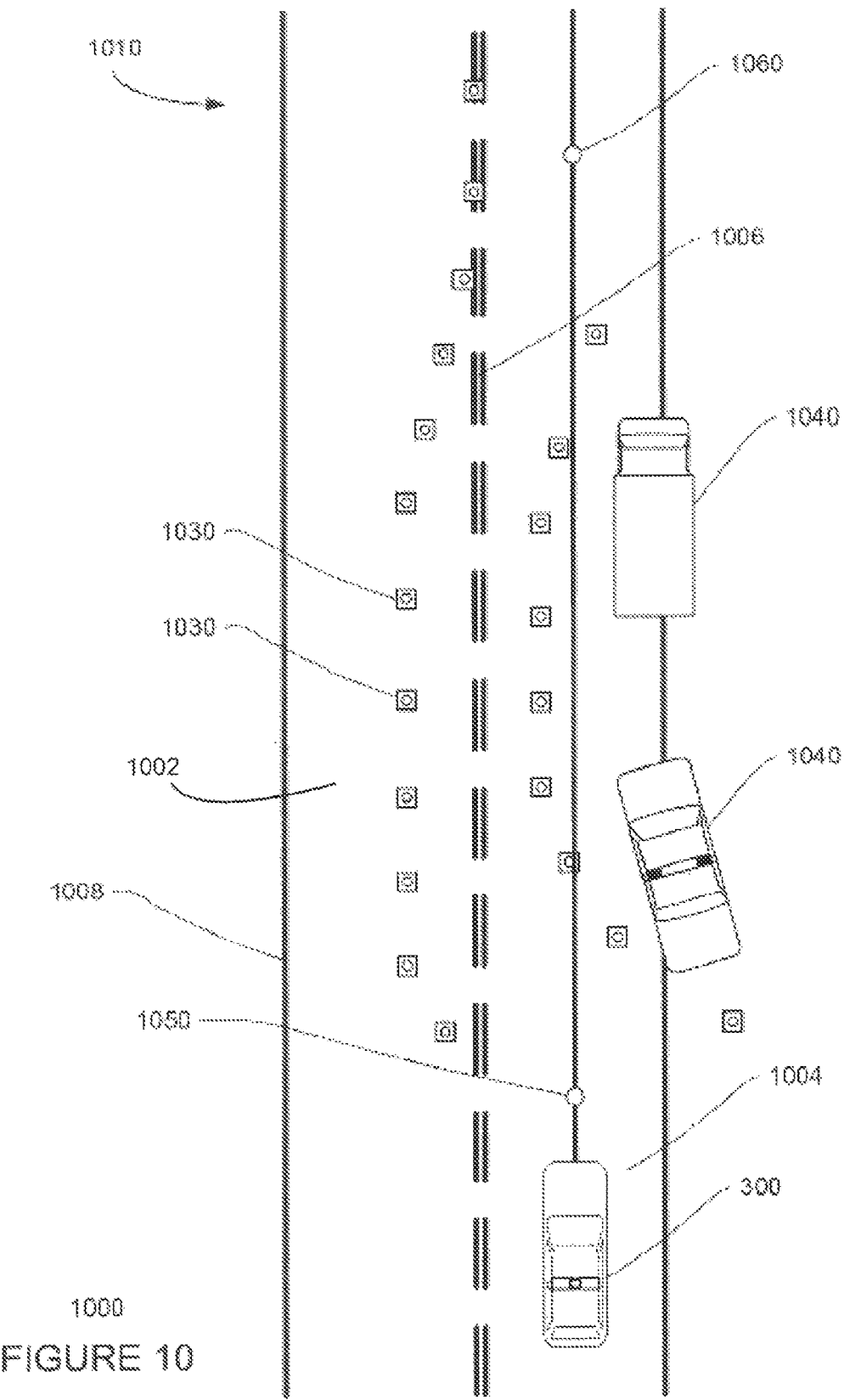
FIG. 10 is another exemplary road map in accordance with an exemplary embodiment.

For example, as shown in map 1000 of FIG. 10, autonomous vehicle 300 is driving along roadway 1010. The roadway includes features such as southbound lane 1002, northbound lane 1004, double yellow line 1006, lane lines 1008, etc. In this example vehicle 300 is following route 1020 along northbound lane 1004. As vehicle 300 approaches point 1050, the driver may identify a temporary construction situation. In this example, cones 1030 have been set up to route vehicles around the construction vehicles 1040. Vehicle 300 may identify all of these objects, but its computer may determine that it is unable to route itself through the cones as they would require the vehicle to pass into the southbound lane. In this example, the driver may take control of the vehicle at point 1050 and relinquish control of the vehicle at point 1060 when the vehicle has cleared the temporary construction situation. In response, the vehicle may generate a new zone in the northbound lane of roadway 1000 between points 1050 and 1060 where the driver took control of the vehicle.

Once the new zone has been generated, the new zone may also be broadcast to other nearby autonomous vehicles. For example, the autonomous vehicle may use a radio link or other network such that other vehicles may be able to observe the same rule (take control of the steering, acceleration, and/or braking) at the new zone or notify the other vehicles' drivers that another driver felt the location was unsafe for autonomous driving. Returning to FIG. 10, vehicle 300 may transmit to information other vehicles identifying a new zone in northbound lane of roadway 1000 between points 1050 and 1060 where the driver took control of the vehicle. As another vehicle, following a route through point 1050 towards point 1060 approach point 1050 the other vehicle may display notifications to its own driver. These notifications may be similar to the notification described above, but may also indicate that the zone was one recently identified by another driver.

The autonomous vehicle may also allow a driver to navigate around zones or simply ignore them in advance. For example, the vehicle's default condition may be to route the vehicle through zones if it is the fastest way to the destination. The driver may select to avoid zones while entering a destination or may select to turn off the zone feature such that no warning is given and the vehicle drives through the zones anyway. The driver may also select to ignore the zones permanently, ignore only those stored in the vehicle's map, or ignore zones identified by other drivers and broadcast by the other drivers' autonomous vehicles.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for maneuvering a vehicle, the method comprising:
   accessing, by one or more processors, map information including a geographic area associated with a rule that indicates a driver to take control of at least one control aspect of the vehicle;
   maneuvering, by the one or more processors, the vehicle in an autonomous driving mode by controlling a first control aspect of the vehicle and a second control aspect of the vehicle without continuous input from the driver, wherein the first and second control aspects are selected from the group consisting of acceleration, deceleration, and steering;
   determining, by the one or more processors, when the vehicle is within a predetermined distance from the geographic area;
   when the vehicle is determined to be within a predetermined distance from the geographic area, identifying, by the one or more processors, the at least one control aspect using the map information;
   generating, by the one or more processors, a notification indicating of the need to control the identified at least one control aspect through the geographic area;
   receiving, by the one or more processors, input indicating that the driver is controlling the first control aspect; and
   in response to receiving the input and while the driver is controlling the first control aspect, continuing, by the one or more processors, to control the second control aspect through the geographic area.

2. The method of claim 1, wherein the first control aspect is the steering control and the second control aspect is the acceleration control.

3. The method of claim 1, wherein the first control aspect is the acceleration control and the second control aspect is the steering control.

4. The method of claim 1, wherein the first control aspect is the deceleration control and the second control aspect is the steering control.

5. The method of claim 1, further comprising:
determining, by the one or more processors, when the vehicle has passed through the geographic area and the driver has relinquished control of the first control aspect; and
when the vehicle is determined to have passed through the geographic area and the driver is determined to have relinquished control of the first control aspect, maneuvering the vehicle, by the one or more processors, by controlling the first control aspect and the second control aspect.

6. The method of claim 1, further comprising:
after generating the notification, determining that the driver has not taken control of the first control aspect; and
when the driver is determine to have not taken control of the first control aspect, escalating an aspect of the notification.

7. The method of claim 1, further comprising determining, by the one or more processors, the predetermined distance based on a current speed of the vehicle.

8. A system for maneuvering a vehicle, the comprising:
memory storing map information including a geographic area associated with a rule that indicates a driver to take control of at least one control aspect of the vehicle;
one or more processors configured to:
access the memory; maneuver the vehicle in an autonomous driving mode by controlling a first control aspect of the vehicle and a second control aspect of the vehicle without continuous input from the driver, wherein the first and second control aspects are selected from the group consisting of acceleration, deceleration, and steering;
determine when the vehicle is within a predetermined distance from the geographic area;
when the vehicle is determined to be within a predetermined distance from the geographic area, identify the at least one control aspect using the map information;
generate a notification indicating of the need to control the identified at least one control aspect through the geographic area;
receive input indicating that the driver is controlling the first control aspect; and
in response to receiving the input and while the driver is controlling the first control aspect, continue to control the second control aspect through the geographic area.

9. The system of claim 8, wherein the first control aspect is the steering control and the second control aspect is the acceleration control.

10. The system of claim 8, wherein the first control aspect is the acceleration control and the second control aspect is the steering control.

11. The system of claim 8, wherein the first control aspect is the deceleration control and the second control aspect is the steering control.

12. The system of claim 8, wherein the one or more processors are further configured to:
determine when the vehicle has passed through the geographic area and the driver has relinquished control of the first control aspect; and
when the vehicle is determined to have passed through the geographic area and the driver is determined to have relinquished control of the first control aspect, maneuver the vehicle by controlling the first control aspect and the second control aspect.

13. The system of claim 8, wherein the one or more processors are further configured to:
after generating the notification, determine that the driver has not taken control of the first control aspect; and
when the driver is determine to have not taken control of the first control aspect, escalate an aspect of the notification.

14. The system of claim 8, wherein the one or more processors are further configured to determine the predetermined distance based on a current speed of the vehicle.

15. A tangible, non-transitory, computer-readable storage medium on which computer readable instructions of a program are stored, the instructions, when executed by a processor, cause the processor to perform a method of maneuvering a vehicle, the method comprising:
accessing map information including a geographic area associated with a rule that indicates a driver to take control of at least one control aspect of the vehicle;
maneuvering the vehicle in an autonomous driving mode by controlling a first control aspect of the vehicle and a second control aspect of the vehicle without continuous input from the driver, wherein the first and second control aspects are selected from the group consisting of acceleration, deceleration, and steering;
determining when the vehicle is within a predetermined distance from the geographic area;
when the vehicle is determined to be within a predetermined distance from the geographic area, identifying the at least one control aspect using the map information;
generating a notification indicating of the need to control the identified at least one control aspect through the geographic area;
receiving input indicating that the driver is controlling the first control aspect; and
in response to receiving the input and while the driver is controlling the first control aspect, continuing to control the second control aspect through the geographic area.

16. The medium of claim 15, wherein the first control aspect is the steering control and the second control aspect is the acceleration control.

17. The medium of claim 15, wherein the first control aspect is the acceleration control and the second control aspect is the steering control.

18. The medium of claim 15, wherein the first control aspect is the deceleration control and the second control aspect is the steering control.

19. The medium of claim 15, wherein the method further comprises:
after generating the notification, determining that the driver has not taken control of the first control aspect; and
when the driver is determine to have not taken control of the first control aspect, escalating an aspect of the notification.

20. The medium of claim 15, wherein the method further comprises determining, by the one or more processors, the predetermined distance based on a current speed of the vehicle.

* * * * *

UNITED STATES PATENT AND TRADEMARK OFFICE
CERTIFICATE OF CORRECTION

| | | |
|---|---|---|
| PATENT NO. | : 9,268,332 B2 | Page 1 of 1 |
| APPLICATION NO. | : 14/324470 | |
| DATED | : February 23, 2016 | |
| INVENTOR(S) | : Michael Steven Montemerlo, Dmitri A. Dolgov and Christopher Paul Urmson | |

It is certified that error appears in the above-identified patent and that said Letters Patent is hereby corrected as shown below:

On the Title Page (*) Notice: "Subject to any disclaimer, the term of this patent is extended or adjusted under 35 U.S.C. 154(b) by 0 days." should read --This patent is subject to a terminal disclaimer, Subject to any disclaimer, the term of this patent is extended or adjusted under 35 U.S.C. 154(b) by 0 days.--

Signed and Sealed this
Third Day of May, 2016

Michelle K. Lee
*Director of the United States Patent and Trademark Office*